United States Patent
Franklin et al.

(10) Patent No.: US 8,839,438 B2
(45) Date of Patent: *Sep. 16, 2014

(54) INTERDICTING MALICIOUS FILE PROPAGATION

(75) Inventors: Douglas North Franklin, Atlanta, GA (US); Richard C. Mays, Suwanee, GA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/609,308

(22) Filed: Sep. 11, 2012

(65) Prior Publication Data

US 2013/0007884 A1    Jan. 3, 2013

Related U.S. Application Data

(63) Continuation of application No. 12/629,941, filed on Dec. 3, 2009, now Pat. No. 8,353,037.

(51) Int. Cl.
| | | |
|---|---|---|
| *G06F 21/00* | (2013.01) | |
| *G06F 21/55* | (2013.01) | |
| *G06F 21/56* | (2013.01) | |
| *H04L 29/06* | (2006.01) | |
| *H04L 9/08* | (2006.01) | |

(52) U.S. Cl.
CPC .............. *G06F 21/552* (2013.01); *H04L 63/145* (2013.01); *H04L 9/08* (2013.01); *G06F 21/564* (2013.01)
USPC .............................. 726/24; 713/188; 713/176

(58) Field of Classification Search
CPC . H04L 63/148; H04L 63/1408; H04L 63/145; H04L 9/08; H04L 9/3281; G06F 21/56; G06F 21/566
See application file for complete search history.

(56) References Cited

U.S. PATENT DOCUMENTS

| | | | |
|---|---|---|---|
| 7,627,762 B2 | 12/2009 | Schaefer et al. | |
| 7,822,818 B2 | 10/2010 | Desouza et al. | |
| 2005/0120242 A1 | 6/2005 | Mayer et al. | |
| 2005/0289151 A1 | 12/2005 | Burke | |
| 2006/0031937 A1 | 2/2006 | Steinberg | |
| 2007/0006028 A1 | 1/2007 | Desouza et al. | |
| 2007/0094178 A1 | 4/2007 | Shin et al. | |
| 2007/0240218 A1* | 10/2007 | Tuvell et al. | ..................... 726/24 |
| 2010/0077482 A1 | 3/2010 | Adams | |
| 2011/0138465 A1 | 6/2011 | Franklin et al. | |

OTHER PUBLICATIONS

Office Action (Mail Date Apr. 11, 2012) for U.S. Appl. No. 12/629,941, filed Dec. 3, 2009.
Amendment filed Jul. 11, 2012 in response to Office Action (Mail Date Apr. 11, 2012) for U.S. Appl. No. 12/629,941, filed Dec. 3, 2009.
Notice of Allowance (Mail Date Aug. 30, 2012) for U.S. Appl. No. 12/629,941, filed Dec. 3, 2009.

* cited by examiner

*Primary Examiner* — Fikremariam A Yalew
(74) *Attorney, Agent, or Firm* — Schmeiser, Olsen & Watts; Arthur J. Samodovitz (57) ABSTRACT

An approach is provided for interdicting malicious file propagation. Packets of a message being transferred to a destination device are received. In response to packet(s) of the message being received, the packet(s) are scanned by determining whether the packet(s) match a corresponding portion of a malicious file. If any of the scanned packet(s) do not match the corresponding portion of the malicious file, a transfer of subsequent packet(s) of the message to the destination device is permitted without performing a scan of the subsequent packet(s). If the scanned packet(s) including a last one or more packets of the message match corresponding portions of the malicious file, a transfer of the scanned packet(s) to the destination device is permitted, except a transfer of the last one or more packets of the message to the destination device is not permitted.

9 Claims, 5 Drawing Sheets

INTERDICTING MALICIOUS FILE PROPAGATION

This application is a continuation application claiming priority to Ser. No. 12/629,941, filed Dec. 3, 2009, now U.S. Pat. No. 8,353,037, issued Jan. 8, 2013.

FIELD OF THE INVENTION

The present invention relates to a data processing method and system for mitigating the propagation of malicious files on a network.

BACKGROUND OF THE INVENTION

Responding to the detection of malcode after the malcode acquires a home on a computer within a network is a costly event in terms of manpower expended investigating the breach, quarantining the computer, performing additional virus scanning, manually creating firewall rules, blocking traffic over particular ports on the network switching fabric, and/or completing other troubleshooting and cleansing techniques. Such manpower costs for addressing a malcode breach are realized even when no additional damage occurs after the initial breach by the malcode. Conventional techniques employ algorithms such as Message Digest Algorithm 5 (MD5) and Secure Hash Algorithm 1 (SHA-1) that compute signatures (i.e., fingerprints) that uniquely identify entire computer files, and compare the computed signatures to the signatures of known malicious files to determine whether the computer files are malcode. Excessive computational resources are required to implement the known malcode detection schemes. Further, because a single signature applies to the entirety of a data file, the entire data file must be processed before determining that the file does not match a known malicious file. Thus, there exists a need to overcome at least one of the preceding deficiencies and limitations of the related art.

SUMMARY OF THE INVENTION

In one or more embodiments, the present invention provides a computer-implemented method of interdicting a propagation of a file in a computer network. One or more segments of a first computer file and a final segment of the first file are determined by determining a series of sizes of segments defined by a function $f$. The first file is being transferred to a first computer system via a network. The one or more segments of the first file are received. One or more signatures that identify the one or more segments of the first file are determined by applying a hash function to each segment of the one or more segments of the first file. The final segment of the first file is received. A signature that identifies the final segment of the first file is determined by applying the hash function to the final segment of the first file. A complete match between a first progressive identifier (pID) of the first file and a second pID of another file (malicious file) is determined by determining a first match between the one or more signatures that identify the one or more segments of the first file and one or more signatures that identify one or more segments of the malicious file and by determining a second match between the signature that identifies the final segment of the first file and a signature of a last segment of the malicious file. The malicious file is another computer file identified as including malicious code. The first pID includes a first series of signatures consisting of the one or more signatures that identify the one or more segments of the first file followed by the signature that identifies the final segment of the first file. The second pID includes a second series of signatures consisting of the one or more signatures that identify the one or more segments of the malicious file followed by the signature that identifies the final segment of the malicious file. Responsive to determining the first match and prior to determining the second match, the one or more segments of the first file are transferred to the first computer system. Responsive to determining the complete match, a processor of a second computer system identifies the first file as being the malicious file and interdicts a transfer of the final segment of the first file to the first computer system.

A system and program product corresponding to the above-summarized methods are also described and claimed herein.

Embodiments of the present invention block the spread of malicious files within a network or internetwork by identifying network transfers of malicious files and blocking subsequent transfers of those malicious files by using progressive identifiers (pIDs). The present invention may block the spread of a malicious file where the file was not known in advance to be malicious.

DETAILED DESCRIPTION OF THE INVENTION

Overview

Embodiments of the present invention interdict the propagation of malicious files (e.g., malcode) within a network after a malicious breach of the network is recognized and the malicious file is identified. In one embodiment, a system of the present invention identifies network transfers of malicious files, identifies in real-time subsequent transfers of those malicious files, and blocks the completion of those subsequent transfers of the malicious files, where the system does not know in advance that the files are malicious. An intrusion protection system (IPS) embodying the present invention may block the subsequent transfers of malicious files by using progressive identifiers (pIDs) determined by computationally efficient (a.k.a. computationally inexpensive) algorithms. As used herein, a computationally efficient algorithm is defined as an algorithm whose required central processing unit (CPU) cycles are less than a first predefined threshold and whose required memory is less than a second predefined threshold. The pIDs are used at intermediate check points during the transfer of a computer file by the IPS to recognize and interdict transfers of malicious content. The pIDs also enable early recognition of a mismatch between a computer file and known malicious files. In one embodiment, an integrated system allows the IPS to address the following steps: (1) recognizing the malicious breach in a computer network; (2) identifying the malicious file that caused the breach; and (3) preventing the propagation of the malicious file to other computer systems in the computer network.

As used herein, a file is defined as a data container encapsulated within traffic in a computer network. A file is also referred to herein as a computer file and a subject file. As used herein, a malicious file (a.k.a. a file that is malicious) is defined as a file for which ingress to a computer system or egress from a computer system is undesirable based on predetermined criteria (e.g., data leakage or propagation of malcode). Data leakage is the uncontrolled and unauthorized transmission of confidential or sensitive data from a computer system.

System for Mitigating the Propagation of Malcode

Figure 1:
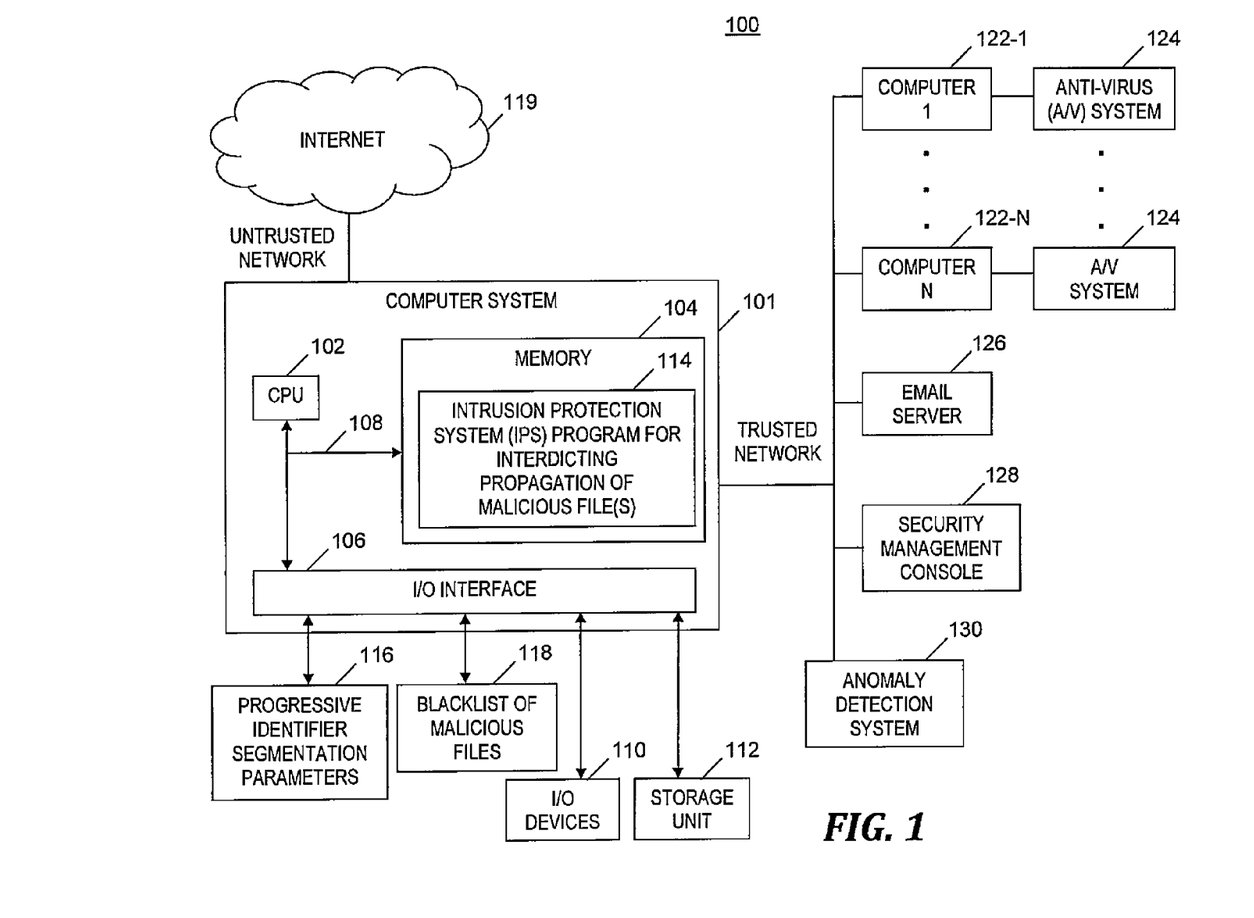
FIG. 1 is a block diagram of a system for interdicting the propagation of one or more malicious files in a computer network, in accordance with embodiments of the present invention.

FIG. 1 is a block diagram of a system for interdicting the propagation of one or more malicious files in a computer network, in accordance with embodiments of the present invention. System 100 includes a computer system 101, which includes a central processing unit (CPU) 102, a memory 104, an input/output (I/O) interface 106, and a bus 108. Memory 104 may include disk storage (to store the computer programs in system 101 prior to execution by CPU 102) and random access memory to store the computer programs in portions during execution. Further, computer system 101 is coupled to I/O devices 110 and a computer data storage unit 112. Memory 104 stores computer program code 114 that provides the logic for an IPS that interdicts a propagation of one or more malicious files in system 100 by using pIDs specified by a hash function and OD segmentation parameters 116 and by comparing received computer files against a blacklist 118 that includes pIDs of files identified as being malicious. Computer system 101, CPU 102, memory 104, I/O interface 106, bus 108, I/O devices 110, storage unit 112 and computer program code 114 are further described in the section entitled Computer System presented below.

The IPS implemented by computer program code 114 is located in system 100 and bridges a first computer network (i.e., an untrusted network) and a second computer network (i.e., a trusted network), which are depicted in FIG. 1. The untrusted computer network provides for transmission of data between the Internet 119 and computer system 101. The trusted computer network provides for transmission of data between computer system 101 and a plurality of computing units (i.e., computer 122-1, . . . , 122-N), each of the computers coupled to an anti-virus (A/V) system 124 (a.k.a. A/V agent). The computing units may be, for example, computer workstations. The trusted computer network also allows for transmission of data between computer system 101 and an optional email server 126, a security management console 128 (a.k.a. network security console or security monitoring console), and an anomaly detection system (ADS) 130. A/V system 124 may be implemented as software or as hardware. Similarly, ADS 130 may be implemented as software or as hardware. In another embodiment, the untrusted computer network may be a network that is not the Internet. For example, computer system 101 may isolate two sections of an internal network within an organization.

The IPS implemented by computer program code 114 (hereinafter, "the IPS 114") inspects all traffic (i.e., data) that crosses the network perimeter, including all traffic entering or leaving the network. The IPS 114 protects the trusted network against the exploitation of vulnerabilities of computers 122-1, . . . , 122-N across Internet 119 from remote computer systems.

The IPS 114 provides the first line of defense for the trusted computer network. The IPS 114 attempts to identify and interdict malicious network traffic before it can reach any of the computers 122-1, . . . , 122-N in the trusted network, or before it can spread from the trusted network to the untrusted network. In system 100, the IPS 114 is deployed on the perimeter of the trusted network as a bulwark against external attackers attempting to gain access to computer systems within the network. In an alternate embodiment, an IPS may be deployed within the network to attempt to prevent any computer systems that external attackers do compromise from compromising any additional computer systems within the trusted network, and to detect and mitigate nefarious insider activities.

System 100 locates A/V agents 124 on individual computing units 122-1, . . . , 122-N within the trusted network. Additional A/V agents may be deployed in the optional email server 126 and in other servers, both within the trusted network and within the network perimeter.

A/V systems 124 detect and interdict malicious software once it arrives at a computing unit (e.g., computer 122-1, . . . , or 122-N). A/V systems 124 represent the second line of defense within the trusted network. A/V systems 124 apply various techniques to try to detect malcode before the malcode executes on a computing unit (e.g., computer 122-1, . . . , or 122-N). In one embodiment, A/V system 124 scans files on or arriving at the computing unit for patterns (i.e., signatures) that identify the files as being malicious.

The ADS 130 provides a third line of defense for the trusted network. System 100 includes ADS 130 on the trusted network, thereby allowing the ADS monitor all traffic on the trusted network. The ADS 130 identifies suspicious traffic patterns anywhere in the trusted network. In another embodiment, the ADS identifies suspicious traffic patterns in a portion of the trusted network that the ADS supports. The ADS 130 examine the traffic patterns on the trusted network in real time. The ADS 130 learns the normal patterns of the traffic within the network. When the ADS 130 discovers unusual or suspicious patterns of traffic that vary from the learned, normal patterns, the ADS raises a security alert for the network operator.

System 100 includes one or more security management consoles 128 within the trusted network. In one embodiment, the IPS and all other network security agents report security events to a single centralized security management console 128.

In one embodiment, multiple protection technologies, such as the IPS, A/V, and ADS agents, are combined into a single application or appliance that provides Unified Threat Management (UTM). UTM systems may also include additional protection technologies, such as firewalls, filters for unsolicited bulk email, and web content filtering.

Process for Mitigating the Propagation of Malcode

Figure 2:
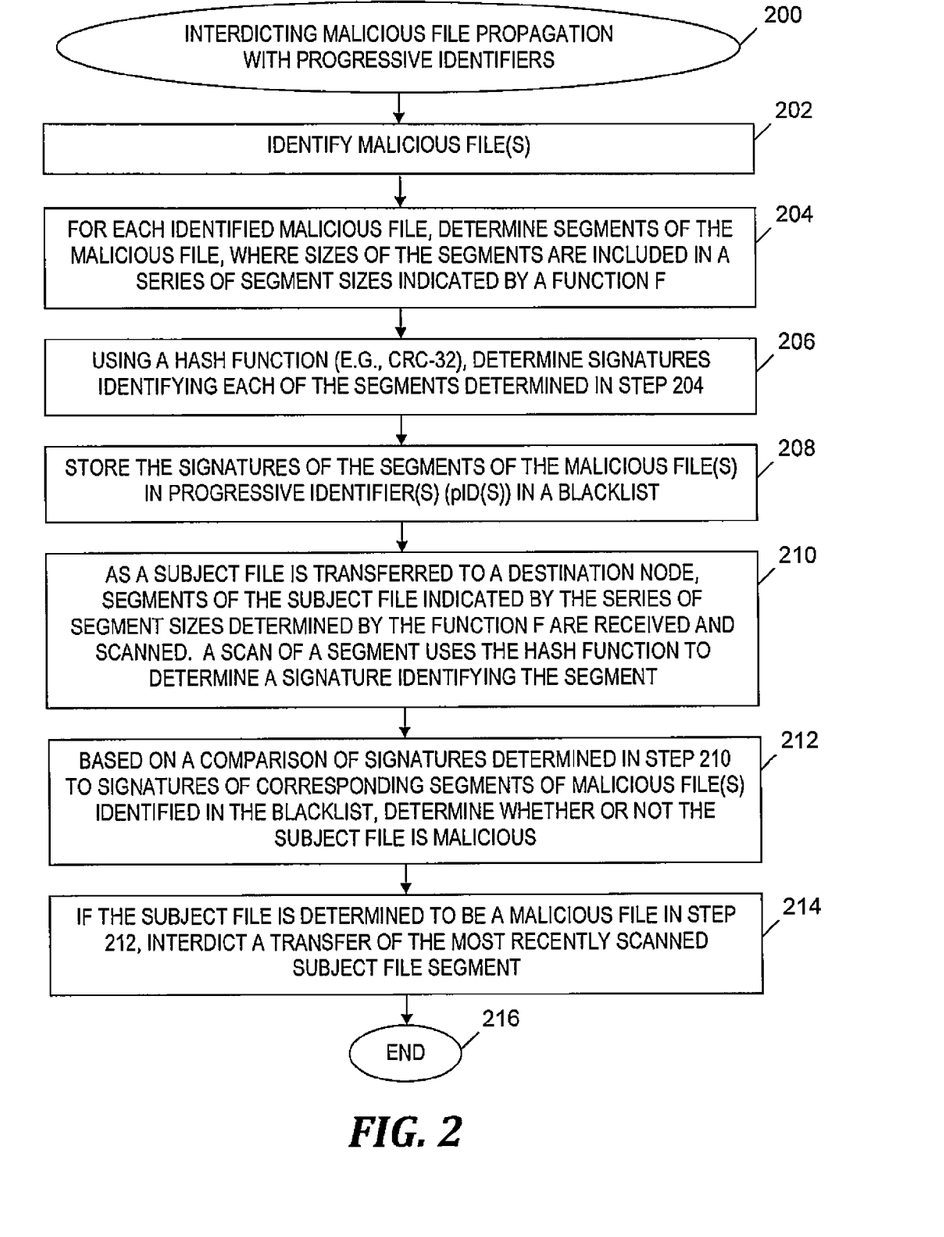
FIG. 2 is a flowchart of a process for interdicting the propagation of a malicious file in a computer network, where the process may be implemented in the system of FIG. 1, in accordance with embodiments of the present invention.

FIG. 2 is a flowchart of a process for interdicting the propagation of a malicious file in a computer network, where the process may be implemented in the system of FIG. 1, in accordance with embodiments of the present invention. The process of FIG. 2 begins at step 200. In step 202, the A/V system 124 (see FIG. 1) or ADS 130 (see FIG. 1) identifies one or more malicious files whose ingress into or egress from system 101 (see FIG. 1) is undesirable based on predefined criteria (e.g., identifies file(s) that maliciously breached the trusted network included in system 100 (see FIG. 1)). In one embodiment, a malicious file identified in step 202 is not the initial malcode residing in an initial malicious file transferred with exploitative network traffic that induces a target computer system into a vulnerable, compromised condition, but is rather malcode in an additional file (i.e., effective payload of the malicious attack) loaded from the global network in a secondary file transfer into the computer system that is newly compromised by the transfer of the initial malicious file.

As one example, if the malcode propagates via email attachments, the transfer of the file attachment represents the malicious attack. Opening the attachment acts as the actual, final stage ingress vector for compromise of the target computer system. In the case of malcode propagation via email attachments, the malicious file identified in step 202 is the file attached to the malicious email.

In step 204, for each malicious file identified in step 202, the IPS 114 (see FIG. 1) determines a plurality of non-overlapping segments (i.e., blocks) of the malicious file. The sizes of the segments are determined in step 204 by a series of segment sizes determined by a function $f$ applied to the malicious file. The function $f$ relates a segment in a series of non-overlapping segments to a size (e.g., a number of bytes) of the segment. In one embodiment, the function $f$ specifies a size of a first segment in the series of segments and a derivation of the size of each subsequent segment in the series of segments by applying a transformation to the size of the previous segment in the series of segments. In general, function $f$ applied to a computer file generates, $f(1), \ldots, f(i), \ldots, f(n)$, where $1 \leq i \leq n$, and where $f(i)$ is a size (e.g., number of bytes) of an i-th segment of a plurality of segments of the computer file. Hereinafter, any mention of segments in a series of segments or in a file, subject file, computer file or malicious file refers to non-overlapping segments.

In one embodiment, the size of the first segment and the transformation that is applied in step 204 to derive the size of each subsequent segment are specified by segmentation parameters 116 (see FIG. 1).

Function $f$ may be manipulated depending on the needs of a specific application domain, but the segment sizes determined by function $f$ must remain deterministic and consistent. The tailoring of function $f$ may include using different sequences of segment sizes for different data objects.

In one embodiment, the function $f$ determines a series of n sizes of n segments of a computer file and is a monotonically increasing function such that given positive integers i and n, n>1, and i<n−1, $f(i+1) > f(i)$. In the embodiment of this paragraph, $f(i)$ is an i-th size in the series of n sizes, $f(i+1)$ is an (i+1)-th size in the series of n sizes, the i-th size is a size of an i-th segment in the series of n segments and the (i+1)-th size is a size of an (i+1)-th segment in the series of n segments.

In one embodiment, the series of segment sizes determined by function $f$ is a geometric sequence that starts with an initial segment size, where each subsequent segment size results from multiplying the previous segment size by a constant. A geometric sequence determined by function $f$ may be expressed as $SM^0, SM^1, SM^2, SM^3, \ldots$, where S is an initial segment size and M is a multiplier. As one example, the geometric sequence may be $G_4(f_c=4^{c-1})$, which may provide a useful amount of "maximum file size" coverage. In the example using the $G_4$ sequence with a 512-byte initial segment size, a pID of 10 hash values covers data objects up to ~44 MB, a pID of 15 hash values covers data objects up to ~44 GB, and a pID of 20 hash values covers ~180 TB.

In an alternate embodiment, the series of segment sizes determined by function $f$ is a factorial sequence. In yet another alternate embodiment, the series of segment sizes determined by function $f$ is a Fibonacci sequence.

In step 206, the IPS 114 (see FIG. 1) applies a computationally efficient hash function (e.g., a Cyclic Redundancy Check (CRC) function) to each segment determined in step 204 to determine (e.g., compute) signatures that identify the segments determined in step 204. The hash function applied in step 206 exhibits computational efficiency in generating a hash value result by requiring a number of CPU cycles that is less than a first predefined threshold for CPU cycles and by requiring an amount of memory that is less than a second predefined threshold for memory. The hash value or code determined by the hash function applied to a segment in step 206 is the signature that identifies the segment. After applying the hash function to each segment of a malicious file, the IPS 114 (see FIG. 1) determines a pID that identifies the complete malicious file, where the pID is a concatenation of the signatures determined in step 206 for the malicious file.

In one example, step 206 includes the IPS 114 (see FIG. 1) applying the CRC-32 Cyclic Redundancy Check to the segments determined in step 204 to determine CRC codes, which are the signatures of the segments. The CRC-32 applied in this embodiment may be defined by the Institute of Electrical and Electronics Engineers (IEEE) 802.3 standard. In another example, step 206 includes the IPS applying the CRC-16 hash function to the segments determined in step 204 to determine hash values that are the signatures of the segments.

In step 208, the IPS 114 (see FIG. 1) stores the pID(s) determined from the signatures determined in step 206 in a blacklist 118 (see FIG. 1). The blacklist may be, for example, a data structure or a database stored on a computer data storage unit (e.g., storage unit 112 in FIG. 1). The blacklist organizes the stored pIDs as multiple series of signatures, where the multiple series of signatures identify the malicious files identified in step 202 in a one-to-one correspondence. That is, each series of signatures (i.e., each pID) identifies a corresponding set of segments of a malicious file, where the corresponding set of segments consists of a plurality of segments determined in step 204 for a particular malicious file. The pIDs stored in the blacklist originate with A/V system 124 (see FIG. 1), security management console 128 (see FIG. 1), ADS 130 (see FIG. 1) and/or other agents external to the IPS 114 (see FIG. 1).

In step 210, as segments of a computer file (a.k.a. the subject file) being transferred to a destination node (i.e., one of the computing units: computer 1, ..., computer N in FIG. 1) are received in real time, the IPS 114 (see FIG. 1) scans the received segments of the subject file in the order the segments appear in the original file. The scanned segments are indicated by a series of segment sizes determined by the function $f$, which was also used in step 204 to determine segment sizes. Function $f$ is applied in step 210 by the IPS according to parameters included in segmentation parameters 116 (see FIG. 1). In one embodiment, the segments received in step 210 are received by the IPS as data packets.

A scan of each segment in step 210 includes applying the hash function to the segment to determine a hash value, which is a signature that identifies the segment being scanned. The hash function used in step 210 is the same hash function used in step 206. The IPS 114 (see FIG. 1) determines a pID that identifies the complete subject file, where the pID is a concatenation of the signatures determined in step 210 for the subject file.

After the hash function is used to determine signatures identifying segments of the subject file, an initial portion of step 212 includes the IPS 114 (see FIG. 1) comparing the signatures determined in step 210 to the signatures of corresponding segments in malicious file(s) stored in the blacklist 118 (see FIG. 1). That is, a signature of an i-th segment of the subject file is compared to the signature of an i-th segment of each malicious file stored in the blacklist.

Based on the aforementioned comparison of the signatures in the initial portion of step 212, a subsequent portion of step 212 includes the IPS 114 (see FIG. 1) determining whether or not the pID of the subject file matches a malicious file's pID stored in blacklist 118 (see FIG. 1). That is, the IPS 114 (see FIG. 1) determines in step 212 whether or not the subject file is a malicious file.

The IPS 114 (see FIG. 1) determines that the subject file is malicious if the signatures identifying all segments of a malicious file whose pID is stored in the blacklist 118 (see FIG. 1) matches the signatures identifying corresponding segments of the subject file.

The IPS 114 (see FIG. 1) determines that the subject file is not malcode if a signature of an i-th segment of the subject file does not match the signature(s) of the i-th segment(s) of the malicious file(s) whose pID(s) are stored in blacklist 118 (see FIG. 1).

In step 214, the IPS 114 (see FIG. 1) interdicts a transfer of the most recently scanned subject file segment if the IPS 114 (see FIG. 1) determined in step 212 that the subject file is malicious. As used herein relative to FIG. 2, "the most recently scanned subject file segment" is defined to be the segment of the subject file that was most recently scanned in step 210 as compared to when other segment(s) of the subject file were scanned in step 210. In one embodiment, if the subject file is determined to be malicious in step 212, then step 214 includes the IPS interdicting a transfer of data packet(s) that include the most recently scanned subject file segment. The process of FIG. 2 ends at step 216.

Figure 3:
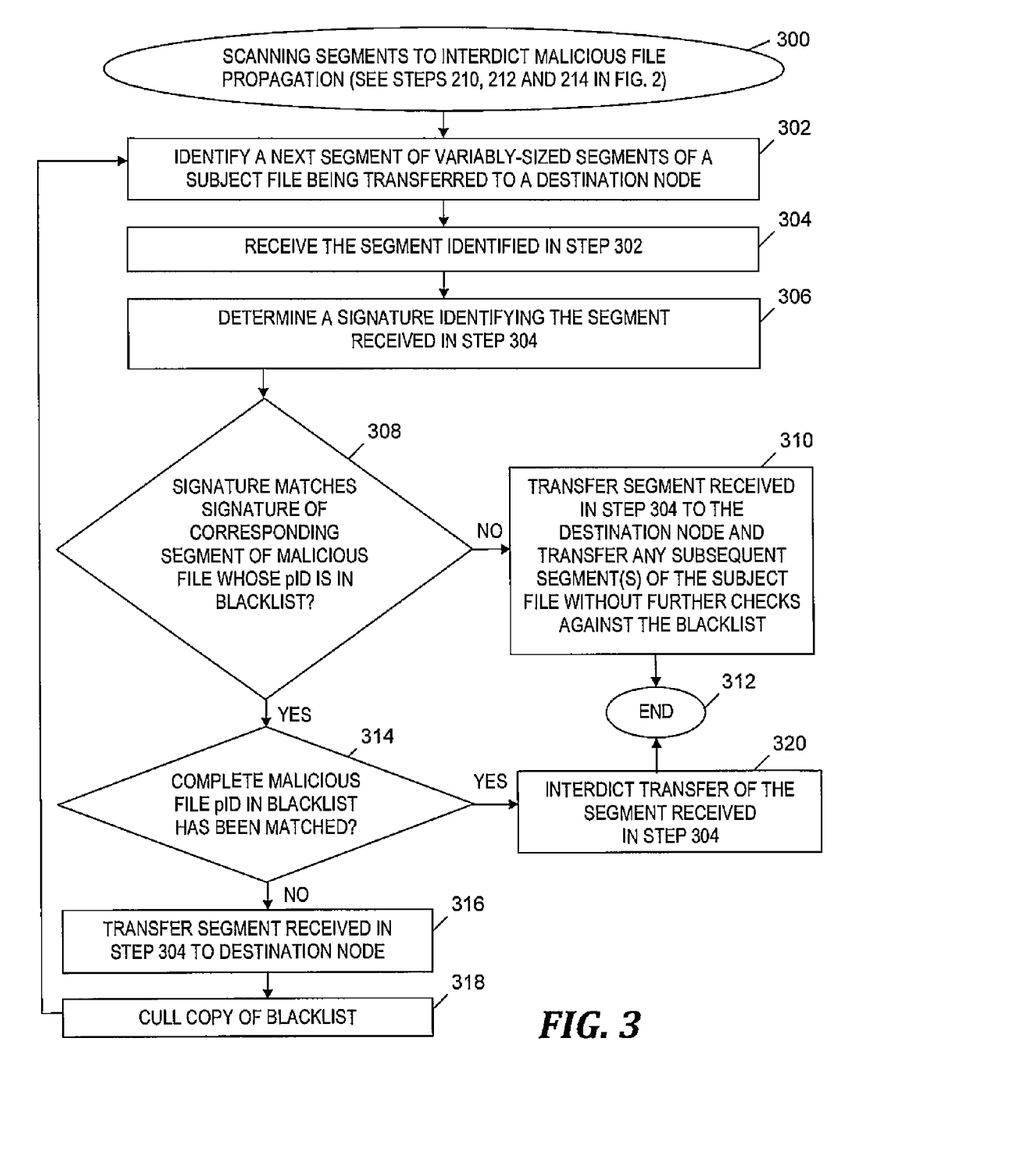
FIG. 3 is a flowchart of a process for scanning segments to interdict malicious file propagation in the process of FIG. 2, in accordance with embodiments of the present invention.

FIG. 3 is a flowchart of a process for scanning segments to interdict malicious file propagation in the process of FIG. 2, in accordance with embodiments of the present invention. The process of FIG. 3 is included in steps 210, 212 and 214 of FIG. 2 and begins at step 300. In step 302, the IPS 114 (see FIG. 1) identifies a next segment of variably-sized segments of the subject file being transferred to a destination node. In one embodiment, the next segment is an i-th segment of the subject file, where the i-th segment is identified by the IPS 114 (see FIG. 1) as being the next X bytes of the subject file and X is equal to $f(i)$. The function $f$ is described above relative to step 204 (see FIG. 2).

In step 304, the IPS 114 (see FIG. 1) receives the segment identified in step 302, where the segment is being transferred to the destination node (e.g., computer 122-1 in FIG. 1).

In one embodiment, receiving the segment in step 304 includes receiving one or more data packets that include the segment identified in step 302, where the one or more data packets are being transferred to the destination node. Step 304 also may include the IPS 114 (see FIG. 1) reordering the received data packets as necessary, so that the IPS is capable of determining signatures in iterations of step 306 in the order that segments natively appear in the subject file.

In step 306, the IPS 114 (see FIG. 1) determines a signature that identifies the segment received in step 304. The signature is a code generated by the hash function being applied to the segment received in step 304. The hash function is the computationally efficient hash function described above relative to step 206 (see FIG. 2). In one embodiment, determining the signature in step 306 includes applying the hash function to the data packet(s) received in step 304, where the data packet(s) include the segment identified in step 302.

A variety of protocols may transport subject files across the networks in system 100 (see FIG. 1). In one embodiment, the IPS 114 (see FIG. 1) employs deep protocol analysis in step 306 to separate the contents of the subject file from the protocol artifacts that encapsulate the contents of the subject file as the subject file traverses the network. By employing deep protocol analysis, an embodiment of the present invention allows real-time access to all of the data of the subject file as the subject file traverses the networks in system 100 (see FIG. 1).

In order to successfully achieve real-time recognition of an identifier of a subject file that matches a blacklisted malicious file, a computationally inexpensive algorithm for calculating the identifier of a subject file is required, as well as an expansion of the concept of such an identifier.

In one embodiment, the determination of a signature in step 306 employs the CRC-32 hash function or one of its related CRC algorithms, which provide computationally inexpensive performance according to predefined criteria. Employing the CRC-32 hash function or a related algorithm in step 306 is less computationally expensive when compared to utilizing cryptographically secure hash functions, such as MD5 and SHA-1, which are used by conventional fingerprinting schemes.

In another embodiment, a variant of the CRC-32 hash function is used in step 306 to determine each signature. The variant of the CRC-32 hash function may omit two bit inversion steps in the CRC-32 algorithm to use fewer CPU cycles and provide better performance.

Using the CRC-32 hash function in step 306 has drawbacks, including providing a smaller output space when compared to the cryptographically secure hash functions, thereby increasing the risk of a false positive result. The false positive result is described in more detail below. Further, simply replacing a single MD5 or SHA-1 value with a single CRC-32 value provides no advantage toward early detection of mismatches between an identifier of a subject file and identifiers of known malicious files. In order to compensate for the smaller output space and facilitate early detection of the aforementioned mismatches, the present invention may combine multiple of CRC-32 values into a single unique signature that identifies the subject file.

Since the entirety of the data of the subject file is scanned segment by segment in iterations of a loop starting at step 302, one embodiment of the present invention generates multiple identifiers or fingerprints (i.e., signatures) that identify segments of a subject file, thereby associating the subject file with a single unique pID that identifies the subject file. The pID includes a sequence of the multiple signatures that identify the segments of the subject file. Each signature of the multiple signatures identifies a corresponding segment of multiple, non-overlapping segments of the subject file, where the segments are identified in iterative performances of step 302.

The subject file identification mechanism based on pIDs allows the IPS 114 (see FIG. 1) to identify subject files in real-time, as they traverse the networks in system 100 (see FIG. 1), with minimal investment of computational resources. An embodiment of the present invention replaces the conventional monolithic fingerprint based on an expensive, cryptographically secure algorithm with a variable length pID using more computationally efficient algorithms to identify files. One embodiment of the present invention uses a slight modification of the CRC-32 algorithm to calculate the individual signatures within the pID. Each individual signature of a pID identifies a specific, corresponding portion of the subject file.

In one embodiment, iterations of step 306 apply the fingerprinting algorithm in a segmented, progressive manner across the entirety of the subject file. That is, the iterations of the loop in the process of FIG. 3 provide a segment-by-segment scan of a subject file to determine if the subject file matches a blacklisted malicious file, at minimal (or reduced) computational expense.

In step 308, the IPS 114 (see FIG. 1) determines whether the signature determined in step 306 matches the signature of corresponding segment(s) of malicious file(s) included in the set of malicious files whose pIDs are stored in blacklist 118 (see FIG. 1). If the IPS in step 308 determines that the signature determined in step 306 does not match the signature of a corresponding segment of any malicious file whose pID is stored in the blacklist, then the IPS identifies the subject file as not being a malicious file, the No branch of step 308 is taken, and step 310 is performed.

In step 310, the IPS 114 (see FIG. 1) transfers the segment received in step 304 to the destination node and transfers any subsequent segment(s) to the destination node without further checks of signatures against signatures in pIDs in the blacklist 118 (see FIG. 1). A subsequent segment is a segment of the subject file received by the IPS 114 (see FIG. 1) subsequent to the method of FIG. 3 taking the No branch of step 308. In one embodiment, transferring the segment in step 310 includes transferring data packet(s) to the destination node, where the data packet(s) include the segment received in step 304. Following step 310, the process of FIG. 3 ends at step 312.

Returning to step 308, if the IPS 114 (see FIG. 1) determines that the signature determined in step 306 matches the signature of one or more corresponding segments of one or more malicious files stored in blacklist 118 (see FIG. 1), then the Yes branch of step 308 is taken and step 314 is performed.

In step 314, the IPS 114 (see FIG. 1) determines whether or not the matches determined in iterative performances of step 308 determine that a complete malicious file's pID included in the blacklist 118 (see FIG. 1) has been matched to the pID of the subject file. That is, the IPS in step 314 determines whether the signatures of all segments of a malicious file in the blacklist have been matched to the signatures of corresponding segments of the subject file, i.e., that the pID of the subject file and the pID of the malicious file match at every corresponding signature comprising the two pID values. For example, if a malicious file in the blacklist contains segments 1, . . . , n, then step 314 checks whether iterative multiple performances of step 308 have matched the signatures of segments 1, . . . , n in the subject file respectively to signatures of segments 1, . . . , n in the malicious file. Hereinafter, determining that signatures of all segments of a malicious file in the blacklist match signatures of corresponding segments of the subject file (i.e., determining the pID of the malicious file matches the pID of the subject file) is referred to as determining a complete match.

If the IPS 114 (see FIG. 1) determines that no complete malicious file in the blacklist 118 (see FIG. 1) has been matched to the subject file by the matching of signatures done in step 308, then a determination of whether the subject file is a malicious file requires scanning and analysis of further segment(s) of the subject file, the No branch of step 314 is taken, and step 316 is performed.

In step 316, the IPS 114 (see FIG. 1) transfers the most recently received subject file segment to the destination node. As used herein relative to FIG. 3, "the most recently received subject file segment" is defined to be the segment of the subject file that was received most recently in a previous performance of step 304 as compared to when other segment(s) of the subject file were received in previous performance(s) of step 304. In one embodiment, step 316 includes the IPS transferring data packet(s) to the destination node, where the data packet(s) include the most recently received subject file segment. In an optional step 318, the IPS 114 (see FIG. 1) culls a copy of the blacklist 118 (see FIG. 1) and the process of FIG. 2 loops back to step 302. In one embodiment, the culling in step 318 includes indicating that each malicious file in a subset of the malicious files whose pIDs are stored in the blacklist 118 (see FIG. 1) has a segment whose signature matches the signature of the corresponding segment of the subject file in the most recent performance of step 308. The indicated subset of the malicious files is used as the set of malicious files in step 308 in the next iteration of the loop that starts at step 302.

Returning to step 314, if the IPS 114 (see FIG. 1) determines that a complete malicious file in the blacklist 118 (see FIG. 1) has been matched by the pID-to-pID matching done by the multiple iterative performances of step 308 (i.e., the IPS determines a complete match), then the IPS identifies the subject file as being a malicious file, the Yes branch of step 314 is taken, and step 320 is performed.

In step 320, the IPS 114 (see FIG. 1) interdicts a transfer to the destination node of the most recently received subject file segment, and in some embodiments may generate a security alert to the other security agents within the networked system 100 (see FIG. 1). In one embodiment, step 320 includes the IPS interdicting a transfer of data packet(s) to the destination node, where the data packet(s) include the most recently received subject file segment. Following step 320, the process of FIG. 3 ends at step 312.

In one embodiment, steps 302, 304 and 306 are included in step 210 (see FIG. 2); steps 308, 310, 314, 316 and 318 are included in step 212 (see FIG. 2); and step 320 is included in step 214 (see FIG. 2).

In one embodiment, an inventive portion of the process of FIG. 3 comprises the application of multiple signature values over variable-sized segments within the subject file. As a subject file traverses a network in system 100 (see FIG. 1), the IPS 114 (see FIG. 1) determines individual signatures of each segment of the subject file (see step 306) as the segments of the subject file are received at the IPS (see step 304), thereby progressively determining the OD of the subject file segment-by-segment. As the IPS 114 (see FIG. 1) receives the end of each segment identified by the individual signatures, the IPS checks the blacklist 118 (see FIG. 1) for matches (see steps 308 and 314) and eliminates the pIDs in the blacklist that cannot match the subject file (see step 318). In this way, the IPS very quickly culls the list of potential matches in step 318 (see FIG. 3), often to zero possibilities or one possibility, within the first few signatures, depending on the volume and distribution of the blacklist 118 (see FIG. 1).

As the process of FIG. 3 progresses through multiple iterations, so does the probability that the subject file is, in fact, one of the files on the culled blacklist. If the last segment of the file does complete a match with a blacklisted item, the IPS 114 (see FIG. 1) interdicts the transfer (see step 320). The method by which the IPS interdicts the transfer in step 320 may vary depending on the protocol transporting the subject file. Step 320 (see FIG. 3) may involve discarding packets on some protocols, canceling sessions on other protocols, or rewriting response packets on still other protocols.

The process of FIG. 3 may generate a false positive condition (i.e., a subject file that is not an identical match to a blacklisted malicious file may be incorrectly determined to be a malicious file). The process of FIG. 3 assumes that matching the entire pID sequence of a malicious file implies completion of the file transfer (see the Yes branch of step 314). A subject file that is longer than a blacklisted malicious file may contain an initial sequence of segments whose pID matches the pID of a blacklisted malicious file, where the pID of the initial sequence of segments is only a prefix of the pID of the complete subject file. That is, the subject file is a superset file of a blacklisted malicious file. In this false positive case, the longer subject file completes a match with a malicious file in the blacklist and triggers a security alert and/or transfer interdiction in step 320 even though the subject file is not identical to the malicious file. While the theoretical possibility of a false positive condition exists, the risk is so low as to not be a concern in actual practice. In fact, compelling arguments exist to warrant blocking the transfer of the aforementioned superset file when the prefix pID value matches a known malicious file in the blacklist.

Progressive Identifier

Figure 4:
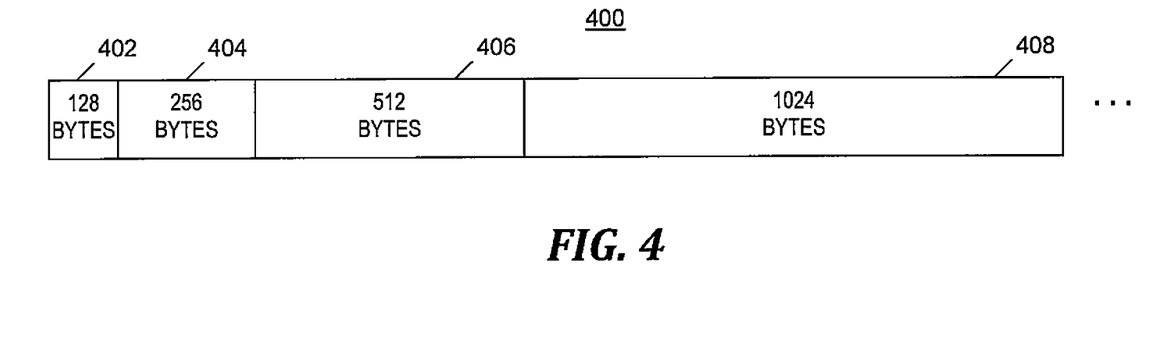
FIG. 4 depicts an example of multiple segments of a subject file for which signatures of a progressive identifier are determined in the process of FIG. 2 or FIG. 3, in accordance with embodiments of the present invention.

FIG. 4 depicts an example of multiple segments of a subject file for which signatures are determined in the process of FIG. 2 or FIG. 3, in accordance with embodiments of the present invention. Subject file 400 illustrates an example of one way in which a pID may be applied to identify a subject file. Subject file includes non-overlapping segments 402, 404, 406 and 408. The sizes in bytes of segments 402, 404, 406 and 408 are in a geometric sequence determined by a function in step 204 (see FIG. 2) or step 302 (see FIG. 3) that uses an initial segment size of 128 bytes and doubles the size of each subsequent segment: $128*2^0$ bytes, $128*2^1$ bytes, $128*2^2$ bytes, $128*2^3$ bytes, . . . (i.e., 128 bytes, 256 bytes, 512 bytes, 1024 bytes, . . . ).

As shown in FIG. 4, the first 1,920 bytes of the exemplary subject file 400 require a pID composed of four individual signatures (i.e., a first signature identifying segment 402, a second signature identifying segment 404, a third signature identifying segment 406 and a fourth signature identifying segment 408).

Although not shown in FIG. 4, the size of the final (i.e., n-th) segment of the subject file may be less than the $128*2^{n-1}$ bytes specified by the aforementioned geometric sequence, depending on the number of remaining bytes in the subject file. For example, using the geometric sequence shown in FIG. 4, a subject file consisting of 1900 bytes is identified by a pID composed of four signatures that identify the following sizes of segments, in order: 128 bytes, 256 bytes, 512 bytes, and 1004 bytes. In this example, the 128-byte, 256-byte and 512-byte sizes are determined by the geometric sequence shown in FIG. 4 and the 1004-byte size is the number of remaining bytes (i.e., 1900 bytes−(128+256+512)), which is less than the 1024 bytes specified by the geometric sequence.

In another embodiment, the size of the final (i.e., n-th) segment of the subject file may be greater than the $128*2^{11}$ bytes specified by the aforementioned geometric sequence if parameters 116 (see FIG. 1) indicates that n must not exceed a predefined maximum value. For example, parameters 116 (see FIG. 1) include a parameter that indicates that n must not exceed a maximum value M. In this example, if the subject file includes $128*2^0+ \ldots +128*^{n-1}$ bytes plus one or more additional bytes and if n=M, then the n-th segment includes $128*^{n-1}$ bytes plus the aforementioned one or more additional bytes, which is greater than the $128*2^{n-1}$ bytes specified by the geometric sequence in FIG. 4.

Using the same approach illustrated in FIG. 4, a twenty kilobyte file requires a pID of seven signatures, and a one megabyte file requires a pID of thirteen signatures. Most malcode samples tend to be much less than one megabyte in size, but the technique presented herein may also be applied to much larger files. For example, a one gigabyte file requires a 23-signature pID using the geometric sequence shown in FIG. 4.

The size of the initial segment and the regimen for adjusting the segment size based on the function f in step 204 (see FIG. 2) may vary with little effect on the efficiency of the process presented in FIG. 2 and FIG. 3. The size of the initial segment and the segment size adjustment based on the function f may be specifically fine tuned for a particular application and the typical sizes of the files of interest. Different applications may employ different segment growth regimens to adjust the growth rate of the pID values, for example. The initial segment size and segment size adjustment are indicated by parameters 116 (see FIG. 1) and are used to determine and identify segments in step 204 (see FIG. 2) and step 302 (see FIG. 3), respectively. Again, another parameter included in parameters 116 (see FIG. 1) may be a maximum number of segments for a subject file. For example, parameters 116 (see FIG. 1) may indicate that the application of function f in step 204 (see FIG. 2) or step 302 (see FIG. 3) determines that the initial segment size of a subject file is 256 bytes, the segment size adjustment for each subsequent segment is 4 multiplied by the number of bytes in the previous segment, and the maximum number of segments of the subject file is 10.

Example Use Cases

However malicious files propagate (e.g., via email or exploitation of network-accessible vulnerabilities), it often involves transfer of a specific file carrying the payload that intends to exploit any security breach accomplished. These files typically, but not exclusively, transit the network over well-known file transfer methods, such as those provided by the following protocols: Microsoft Server Message Block (SMB) (a/k/a Windows File Sharing), Hypertext Transfer Protocol (HTTP), Post Office Protocol (POP), Internet Message Access Protocol (IMAP), Simple Mail Transfer Protocol (SMTP), and File Transfer Protocol (FTP).

If a victim (i.e., target) computer system receives a malicious file, the host A/V agents may or may not detect the malicious file's arrival. If no security component detects the presence of malicious software on the victim computer, then little can be done to stop the spread of malicious software. However, if any agent in the multi-tiered defense can detect the malcode, or recognize the fact that a computer system has been compromised within the network, then the present invention provides an Integrated Intrusion Prevention System (IIPS) with a tool to thwart the propagation of the malcode subsequent to the victim computer system being compromised.

The remainder of this section presents two use cases as examples by treating two specific scenarios as applied to the network topology described in FIG. 1:

Use Case A: Delivery of a malicious file that the A/V agent on the target computer system detects.
  Use Case B: Delivery of a malicious file that escapes detection by the A/V agent on the target computer system.

In both of the above-mentioned scenarios, suppose that an A/V agent (not shown) runs on the email server 126 (see FIG. 1), as well as on the computer systems 122-1, . . . , 122-N within the network.

Use Case A: Malicious File Detected by A/V

A malicious file arrives at the email server 126 (see FIG. 1) as an attachment but evades detection by the A/V agent on the email server. This evasion of detection may eventuate for a variety of reasons, including various sorts of polymorphism or simply because the attachment represents a malicious file not previously encountered.

Due to the nature of mass mailing worms, the email server might receive numerous copies of the threat (i.e., the malicious file as email attachments) in a short period. The first user receives the attachment at a first computer (e.g., computer 122-1 in FIG. 1) and opens the attachment. At this point, the A/V agent (e.g., A/V system 124 in FIG. 1) installed on the first computer may detect the malicious intent of the attachment and prevent the malcode in the attachment from being run. The A/V agent may also perform other interdictory actions, such as quarantining the malicious file. The A/V agent also generates a security alert to the appropriate security monitoring consoles (e.g., security management console 128 in FIG. 1) within the trusted network in system 100 (see FIG. 1).

Even though the A/V agent installed on the aforementioned first computer prevented the malicious file from compromising the first computer, additional copies of that same malicious file may still exist in the email server 126 (see FIG. 1), patiently awaiting additional users to open the attachments hiding the malcode. Stopping the additional copies of the malcode file from having a chance to compromise additional computers (e.g., computer 122-N in FIG. 1) within the network increases the security of the network as a whole. Some user workstations may not have updated A/V signatures or may have A/V detection turned off.

When an A/V agent detects that a file is malicious, in many cases it can also calculate the pID of the malicious file. If it supplies the pID to IPS agents (e.g., IPS 114 in FIG. 1) within the network the IPS agents can then recognize subsequent transfers of the same malicious file in real-time, "on the wire" (see the Yes branches of steps 308 and 314 in FIG. 3), and prevent the subsequent transfers from completing successfully (see step 320 in FIG. 3). IPS systems deployed internally to the network can interdict subsequent transfers from the email server 126 (see FIG. 1) to the workstations (i.e., computer 122-1, . . . , computer 122-N).

The A/V agent distributes the calculated pID values to the IPS agents within the network in a variety of ways. In one embodiment, the A/V agent simply reports the pID to a system-wide management console (e.g., security management console 128 in FIG. 1), which would then take responsibility for propagating the pID throughout the network's security infrastructure. Manual confirmation may or may not be required prior to the distribution of the pID throughout the network's security infrastructure.

Another embodiment requires that the A/V agent craft and transmit a notification of the pID as a specially formatted network packet that includes the pID, allowing the IPS systems to recognize, capture, and effect the notification, possibly in real-time.

Use Case B: Malicious File not Detected by A/V

A malicious attachment arrives at the email server and escapes detection by the A/V agent on the email server 126 (see FIG. 1). A workstation operator opens the attachment, the malcode escapes detection by the A/V agent on the workstation (e.g., A/V system 124 installed on computer 122-1 in FIG. 1), and the malcode infects the workstation. In this case, all of the A/V agents in the network's defensive system failed to detect the malicious intent of the attachment, so the targeted computer becomes infected. The network's defensive system utilizes the ADS 130 (see FIG. 1) to determine the pID of the attachment file that caused the infection.

Before executing any file not on a known whitelist, the A/V agent 124 (see FIG. 1) computes the pID of the file and transmits the computed pID to one or more ADS agents 130 (see FIG. 1), IPS systems, consoles, or other security event aggregation agents. If a malicious file begins to propagate within the network, the ADS 130 (see FIG. 1) correlates the propagation with the likely cause by examining the pIDs most recently provided by the A/V agents 124 (see FIG. 1) prior to the known start of the infection. The ADS 130 (see FIG. 1) then supplies the appropriate pID to the IPS agents (e.g., IPS 114 in FIG. 1) within the network, thereby inoculating the network against that particular malicious file threat.

Integrated Intrusion Protection System

In one embodiment, the IPS, ADS, and A/V agents are integrated into a coherent whole. In this manner, each component of the integrated network defense system gains access to the greatest amount of semantic information regarding a malicious file threat. However, some customer deployments contain only the IPS component, eschewing the ADS and A/V components. In this case, procedural steps entirely within the IPS can detect and prevent the propagation of malcode files.

In Use Case B (i.e., Malicious File Not Detected by A/V) presented above, the A/V agent 124 (see FIG. 1) computed the pID. The ADS agent(s) 130 (see FIG. 1) identified infected targets and heuristically determined the file most likely to have compromised the infected systems and determined the file's pID. With an IIPS deployment, all three steps must occur within the IPS: detecting malcode files, creating pIDs, and blocking propagation of the malcode files. In this section, the system that implements the BPS is a modification of system 100 (see FIG. 1) in which the IPS 114 (see FIG. 1) includes the logic that implements the IIPS. Further, the modification of system 100 (see FIG. 1) that implements the IIPS does not include ADS 130 (see FIG. 1) or any of the A/V systems 124 (see FIG. 1).

This section discusses further refinements to the invention to allow a realization within the confines of an BPS offering. While the progressive identifier technique by itself constitutes a novel and non-obvious identification method, the further integration within the IPS of the pID creation and malcode recognition processes provide additional inventive aspects.

The IIPS deployment described in this section lacks any A/V component to determine in advance the malicious status of a file. Thus, the BPS must heuristically determine that a computer has been compromised as described above in Use Case B (i.e., Malicious File Not Detected by A/V).

In Use Case B, the ADS agent assumed responsibility for detecting malcode by the malcode's effects on network traffic. Conventional integrated network defense systems separate the ADS component from the IPS component because the IPS must operate in real-time, while the ADS has more time for reflection and analysis. However, if the IPS agent includes sufficient computing resources, the IPS agent can also perform at least some of the analyses typically assigned to the ADS agent.

The IPS may employ a variety of unique heuristics to conclude with a high degree of certainty that particular network traffic originates with malcode. A partial list of such unique heuristics includes the following:

1. Detection of known vulnerability attacks originating from previously trusted addresses.
2. Recognition of well-known malcode "phone home" traffic patterns.
3. Recognition of well-known malicious payloads or sources.
4. Detection of an address using protocols for which it is not authorized (e.g., Internet Relay Chat (IRC)).
5. Detection of encrypted traffic absent a key exchange.
6. Recognition of traffic to or from suspicious network addresses (e.g., Uniform Resource Locators (URLs) or Internet Protocol (IP) addresses)

As in Use Case B described above, recognizing the presence of malcode on the network provides little advantage to the integrated network defense system unless the system can correlate that knowledge to a specific file traversing the network. The TIPS addresses the need to correlate a recognized presence of malcode to a specific file traversing the network by maintaining a collection of the pID values for all files transmitted to endpoints within the network. In parallel, the IIPS inspects the traffic patterns emanating from the endpoints. If the traffic patterns emanating from the endpoints indicate the presence of malcode on an endpoint, the IPS heuristically determines which of the files delivered to that endpoint most likely triggered the infection.

The process implemented by the IIPS may utilize a variety of parameters that can tune the operation of the IIPS to the specifics of different network environments. One parameter may specify the amount of time the IIPS maintains individual transfer records, which can drastically affect the detection and false detection rates. Another parameter may control the number of suspicious incidents the IIPS must observe before declaring a particular file a malcode file.

A further inventive aspect of the IIPS technique raises the evaluation priority of traffic based on heightened suspicion that malcode may have recently arrived at a computer system.

Increasing the suspicion level associated with traffic for a computer system may originate with the size of the file transferred. The vast majority of malcode files consume a few kilobytes to a few dozen kilobytes. Relatively few reach even one megabyte in size, largely due to the author of the malcode having a desire to "fly in under the radar."

The IIPS may combine other techniques and trust policies to further reduce the workload associated with tracking potentially untrusted files. For example, the IIPS may maintain a whitelist of signing certificates to prevent ActiveX controls from trusted sources from being considered suspicious.

Figure 5:
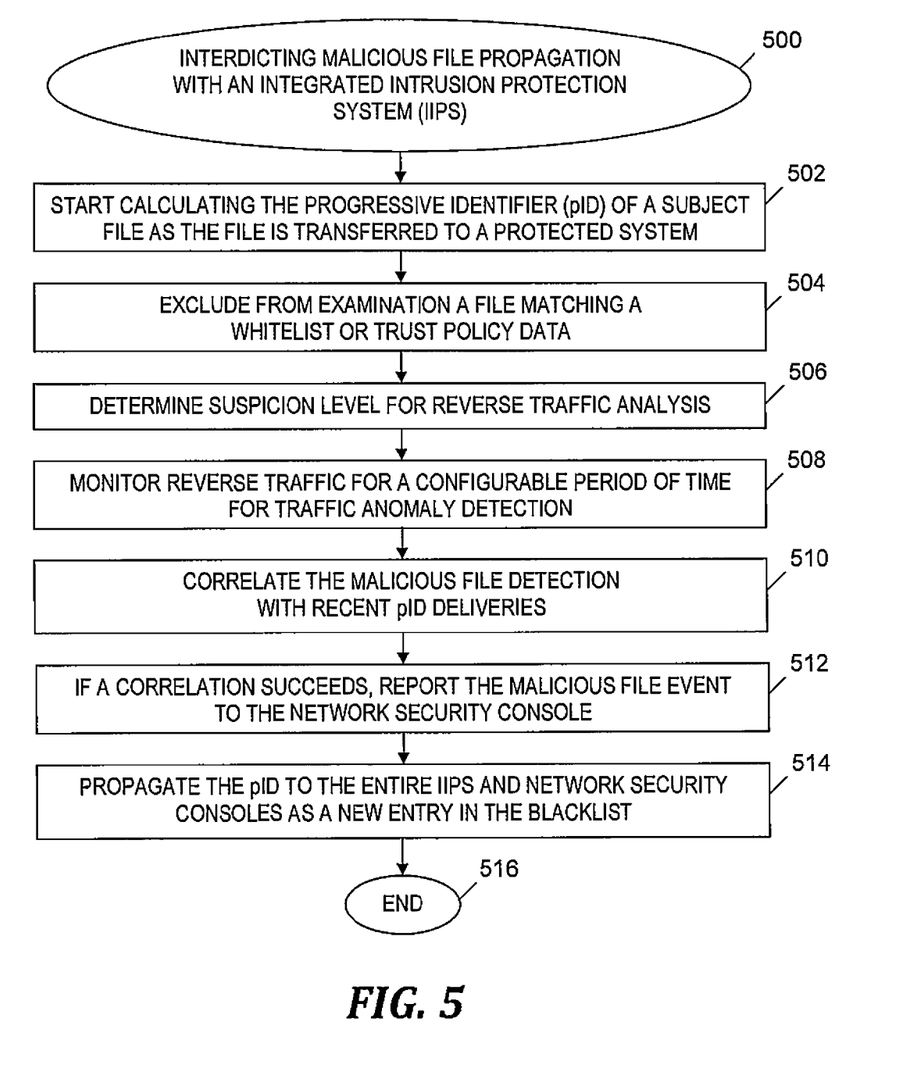
FIG. 5 is a flowchart of a process of interdicting the propagation of a malicious file with an integrated intrusion protection system that integrates components of the system of FIG. 1, in accordance with embodiments of the present invention.

FIG. 5 is a flowchart of a process of interdicting the propagation of a malicious file with an integrated intrusion protection system that integrates components of the system of FIG. 1, in accordance with embodiments of the present invention. The generalized process implemented by the IIPS starts at step 500. In step 502, the IIPS starts calculating the pID of a subject file as the subject file is transferred to a protected computer system.

In step 504, the IIPS excludes from examination a subject file that matches whitelist or trust policy data. Although not shown in FIG. 5, if the subject file is excluded from examination in step 504, the process of FIG. 5 ends at step 516; otherwise the process continues with step 506.

In step 506, the IIPS determines the suspicion level for reverse traffic analysis. In step 508, the IIPS monitors reverse traffic for a configurable period for traffic anomaly detection. The IIPS detects the presence of malcode based on a detection of a traffic anomaly at an endpoint.

In step 510, the IIPS correlates a detection of malcode with recent pID deliveries. In step 512, if a correlation in step 510 succeeds, the IIPS reports the malcode event to the network security console.

In step 512, the IIPS propagates the pID to the entire system that implements the IIPS and to network security consoles, which enter the pID as a new entry in a blacklist.

Between steps 512 and 514, the IIPS may optionally require operator intervention to confirm blocking of a file inferred to be malicious. If the IIPS allows or demands automated blocking, then the network security console provides a way to move pIDs between the blacklist and whitelist. This allows operators to contravene any actions the IIPS takes based on mistaken heuristic interpretations of the network activity.

Computer System

FIG. 1 includes computer system 101, which implements the processes of FIGS. 2 and 3, in accordance with embodiments of the present invention. In another embodiment, computer system 101 in FIG. 1 may also implement the process of FIG. 5. Computer system 101 generally comprises a central processing unit (CPU) 102, a memory 104, an input/output (I/O) interface 106, and a bus 108. Further, computer system 101 is coupled to I/O devices 110 and a computer data storage unit 112. CPU 102 performs computation and control functions of computer system 101. CPU 102 may comprise a single processing unit, or be distributed across one or more processing units in one or more locations (e.g., on a client and server)

Memory 104 may comprise any known computer readable storage medium, which is described below. In one embodiment, cache memory elements of memory 104 provide temporary storage of at least some program code (e.g., program code 114) in order to reduce the number of times code must be retrieved from bulk storage while instructions of the program code are carried out. Moreover, similar to CPU 102, memory 104 may reside at a single physical location, comprising one or more types of data storage, or be distributed across a plurality of physical systems in various forms. Further, memory 104 can include data distributed across, for example, a local area network (LAN) or a wide area network (WAN).

I/O interface 106 comprises any system for exchanging information to or from an external source. I/O devices 110 comprise any known type of external device, including a display device (e.g., monitor), keyboard, mouse, printer, speakers, handheld device, facsimile, etc. Bus 108 provides a communication link between each of the components in computer system 101, and may comprise any type of transmission link, including electrical, optical, wireless, etc.

I/O interface 106 also allows computer system 101 to store and retrieve information (e.g., data or program instructions such as program code 114) from an auxiliary storage device such as computer data storage unit 112 or another computer data storage unit (not shown). Computer data storage unit 112 may comprise any known computer readable storage medium, which is described below. For example, computer data storage unit 112 may be a non-volatile data storage device, such as a magnetic disk drive (i.e., hard disk drive) or an optical disc drive (e.g., a CD-ROM drive which receives a CD-ROM disk).

Memory 104 may include computer program code 114 that provides the logic for interdicting propagation of malcode (e.g., the process of FIG. 2 or FIG. 3). Further, memory 104 may include other systems not shown in computer system 101, such as an operating system (e.g., Linux) that runs on CPU 102 and provides control of various components within and/or connected to computer system 101.

Memory 104, storage unit 112, and/or one or more other computer data storage units (not shown) that are coupled to computer system 101 may store parameters 116 and blacklist 118.

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 or computer system 101). Furthermore, an embodiment of the present invention may take the form of a computer program product embodied in one or more computer readable medium(s) (e.g., memory 104 or computer data storage unit 112) having computer readable program code (e.g., program code 114) embodied or stored thereon.

Any combination of one or more computer readable medium(s) (e.g., memory 104 and computer data storage unit 112)

may be utilized. The computer readable medium may be a computer readable signal medium or a computer readable storage medium. A computer readable storage medium may be, for example, but not limited to, an electronic, magnetic, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program (e.g., program 114) for use by or in connection with a system, apparatus, or device for carrying out instructions. The terms "computer readable storage medium" and "computer-readable storage device(s)" do not mean signal propagation media such as copper cables, optical fibers and wireless transmission media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 114) embodied on a computer readable medium may be transmitted using any appropriate medium, including but not limited to wireless, wireline, optical fiber cable, RF, etc., or any suitable combination of the foregoing.

Computer program code (e.g., program code 114) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 101 or another computer system (not shown) having components analogous to the components of computer system 101 included in FIG. 1. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIG. 3, and FIG. 5) and/or block diagrams of methods, apparatus (systems) (e.g., FIG. 1), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 114). These computer program instructions may be provided to a processor (e.g., CPU 102) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 104 or computer data storage unit 112) that can direct a computer (e.g., computer system 101), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 101), other programmable data processing apparatus, or other devices to cause a series of operational steps to be performed on the computer, other programmable apparatus, or other devices to produce a computer implemented process such that the instructions which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of interdicting malcode propagation with progressive identifiers. Thus, an embodiment of the present invention discloses a process for supporting computer infrastructure, comprising integrating, hosting, maintaining and deploying computer-readable code (e.g., program code 114) into a computer system (e.g., computer system 101), wherein the code in combination with the computer system is capable of performing a process of interdicting malcode propagation with progressive identifiers.

In another embodiment, the invention provides a business method that performs the process steps of the invention on a subscription, advertising and/or fee basis. That is, a service provider, such as a Solution Integrator, can offer to create, maintain, support, etc. a process of interdicting malcode propagation with progressive identifiers. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2, FIG. 3, and FIG. 5 and the block diagram in FIG. 1 illustrate the architecture, functionality, and operation of possible implementations of systems, methods, and computer program products according to various embodiments of the present invention. In this regard, each block in the flowchart or block diagram may represent a module, segment, or portion of code (e.g., program code 114), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for determining if a message is malicious, the method comprising the steps of:
   (a) a computer scanning an Nth packet of an actual sequence of packets in the message beginning with N=1, determining whether the Nth packet and prior packets, if any, in the actual sequence, match corresponding packet(s) in one of a set of messages predetermined to be malicious, and determining whether N is before a last packet in the actual sequence, and if N is before the last packet in the actual sequence, the computer passing the Nth packet to a destination of the message; and
   (b) the computer incrementing N and repeating step (a) and the incrementing of N until either (i) N equals the last packet in the actual sequence or (ii) the Nth packet, which is before the last packet in the actual sequence, and all prior packets in the actual sequence do not match a corresponding segment of any of the set of messages predetermined to be malicious, and if N equals the last packet in the actual sequence and the Nth packet and all prior packets in the actual sequence match the corresponding packets in one of the set of messages predetermined to be malicious, the computer blocking the last packet in the sequence from being sent to the destination, if N equals the last packet in the actual sequence and the Nth packet and all prior packets in the actual sequence do not match a corresponding segment of any of the set of messages predetermined to be malicious, the computer passing the last packet in the actual sequence to the destination, or if N is before the last packet in the actual sequence, the computer passing substantially all subsequent packets in the actual sequence to the destination without scanning said subsequent packets.

2. The method of claim 1, further comprising the steps of:
   the computer determining N equals the last packet in the actual sequence and the Nth packet and all prior packets in the actual sequence match the corresponding packets in one of the set of messages predetermined to be malicious; and
   based on N equaling the last packet in the actual sequence and the Nth packet and all prior packets in the actual sequence matching the corresponding packets in one of the set of messages predetermined to be malicious, the computer providing an indication to the destination to render the message harmless to the destination by discarding all packet(s) of the message that were passed to the destination.

3. The method of claim 1, wherein the step of scanning and the step of repeating step (a) include applying a hash function to the Nth packet and to prior packets, if any, to determine a signature of the Nth packet and the prior packets, and
   wherein the step of determining whether the Nth packet and the prior packets, if any, match the corresponding packet(s) in one of the set of messages predetermined to be malicious includes the computer determining a signature of the corresponding packet(s) in one of the set of messages predetermined to be malicious, and the computer determining whether the signature of the packet(s) of the Nth packet and the prior packets matches the signature of the corresponding packet(s) in one of the set of messages predetermined to be malicious.

4. A computer system for determining if a message is malicious, the computer system comprising:
   one or more processors;
   one or more computer-readable memories;
   one or more computer-readable, storage devices; and
   program instructions stored on the one or more storage devices for execution by the one or more processors via the one or more memories, the program instructions comprising:
   first program instructions to scan an Nth packet of an actual sequence of packets in the message beginning with N=1, determine whether the Nth packet and prior packets, if any, in the actual sequence, match corresponding packet(s) in one of a set of messages predetermined to be malicious, and determine whether N is before a last packet in the actual sequence, and if N is before the last packet in the actual sequence, pass the Nth packet to a destination of the message; and
   second program instructions to increment N and repeating an execution of the first program instructions and an incrementing of N by the second program instructions until either (i) N equals the last packet in the actual sequence or (ii) the Nth packet, which is before the last packet in the actual sequence, and all prior packets in the actual sequence do not match a corresponding segment of any of the set of messages predetermined to be malicious, and if N equals the last packet in the actual sequence and the Nth packet and all prior packets in the actual sequence match the corresponding packets in one of the set of messages predetermined to be malicious, block the last packet in the sequence from being sent to the destination, if N equals the last packet in the actual sequence and the Nth packet and all prior packets in the actual sequence do not match a corresponding segment of any of the set of messages predetermined to be malicious, pass the last packet in the actual sequence to the destination, or if N is before the last packet in the actual sequence, pass substantially all subsequent packets in the actual sequence to the destination without a scan of the subsequent packets.

5. The computer system of claim 4, further comprising:
   third program instructions, stored on the one or more storage devices for execution by the one or more processors via the one or more memories, to determine N equals the last packet in the actual sequence and the Nth packet and all prior packets in the actual sequence match the corresponding packets in one of the set of messages predetermined to be malicious; and
   fourth program instructions, stored on the one or more storage devices for execution by the one or more processors via the one or more memories, to provide, based on N equaling the last packet in the actual sequence and the Nth packet and all prior packets in the actual sequence matching the corresponding packets in one of the set of messages predetermined to be malicious, an indication to the destination to render the message harmless to the destination by discarding all packet(s) of the message that were passed to the destination by an execution of the first and second program instructions.

6. The computer system of claim 4, wherein the first program instructions to scan and second program instructions to repeat the execution of the first program instructions apply a hash function to the Nth packet and to prior packets, if any, to determine a signature of the Nth packet and the prior packets, and     wherein the first program instructions to determine whether the Nth packet and the prior packets, if any, match the corresponding packet(s) in one of the set of messages predetermined to be malicious determine a signature of the corresponding packet(s) in one of the set of messages predetermined to be malicious, and     determine whether the packet(s) of the message match the corresponding portion of the malicious file by determining whether the signature of the packet(s) of the Nth packet and the prior packets matches the signature of the corresponding packet(s) in one of the set of messages predetermined to be malicious.

7. A computer program product for determining if a message is malicious, the computer program product comprising:

computer-readable, storage device(s); and program instructions stored on the computer-readable storage device(s), the program instructions comprising:

program instructions to scan, an Nth packet of an actual sequence of packets in the message beginning with N=1, determine whether the Nth packet and prior packets, if any, in the actual sequence, match corresponding packet(s) in one of a set of messages predetermined to be malicious, and determine whether N is before a last packet in the actual sequence, and if N is before the last packet in the actual sequence, pass the Nth packet to a destination of the message; and     program instructions to increment N and repeating an execution of the program instructions to scan, determine whether the Nth packet and prior packets match the corresponding packet(s), and determine whether N is before the last packet, and to increment N by the second program instructions until either (i) N equals the last packet in the actual sequence or (ii) the Nth packet, which is before the last packet in the actual sequence, and all prior packets in the actual sequence do not match a corresponding segment of any of the set of messages predetermined to be malicious, and if N equals the last packet in the actual sequence and the Nth packet and all prior packets in the actual sequence match the corresponding packets in one of the set of messages predetermined to be malicious, block the last packet in the sequence from being sent to the destination, if N equals the last packet in the actual sequence and the Nth packet and all prior packets in the actual sequence do not match a corresponding segment of any of the set of messages predetermined to be malicious, pass the last packet in the actual sequence to the destination, or if N is before the last packet in the actual sequence, pass substantially all subsequent packets in the actual sequence to the destination without a scan of the subsequent packets.

8. The program product of claim 7, further comprising:

program instructions, stored on the storage device(s), to determine N equals the last packet in the actual sequence and the Nth packet and all prior packets in the actual sequence match the corresponding packets in one of the set of messages predetermined to be malicious; and   program instructions, stored on the storage device(s), to provide, based on N equaling the last packet in the actual sequence and the Nth packet and all prior packets in the actual sequence matching the corresponding packets in one of the set of messages predetermined to be malicious, an indication to the destination to render the message harmless to the destination by discarding all packet(s) of the message that were passed to the destination by an execution of the program instructions to pass the Nth packet to the destination and the program instructions to pass substantially all subsequent packets in the actual sequence to the destination.

9. The program product of claim 7, wherein the program instructions to scan and the program instructions to repeat apply a hash function to the Nth packet and to prior packets, if any, to determine a signature of the Nth packet and the prior packets, and     wherein the program instructions to determine whether the Nth packet and the prior packets, if any, match the corresponding packet(s) in one of the set of messages predetermined to be malicious determine a signature of the corresponding packet(s) in one of the set of messages predetermined to be malicious, and determine whether the signature of the packet(s) of the Nth packet and the prior packets matches the signature of the corresponding packet(s) in one of the set of messages predetermined to be malicious.

\* \* \* \* \*